No. 762,545. PATENTED JUNE 14, 1904.
H. T. MERRIAM.
PIPE COUPLING.
APPLICATION FILED AUG. 12, 1903.
NO MODEL.
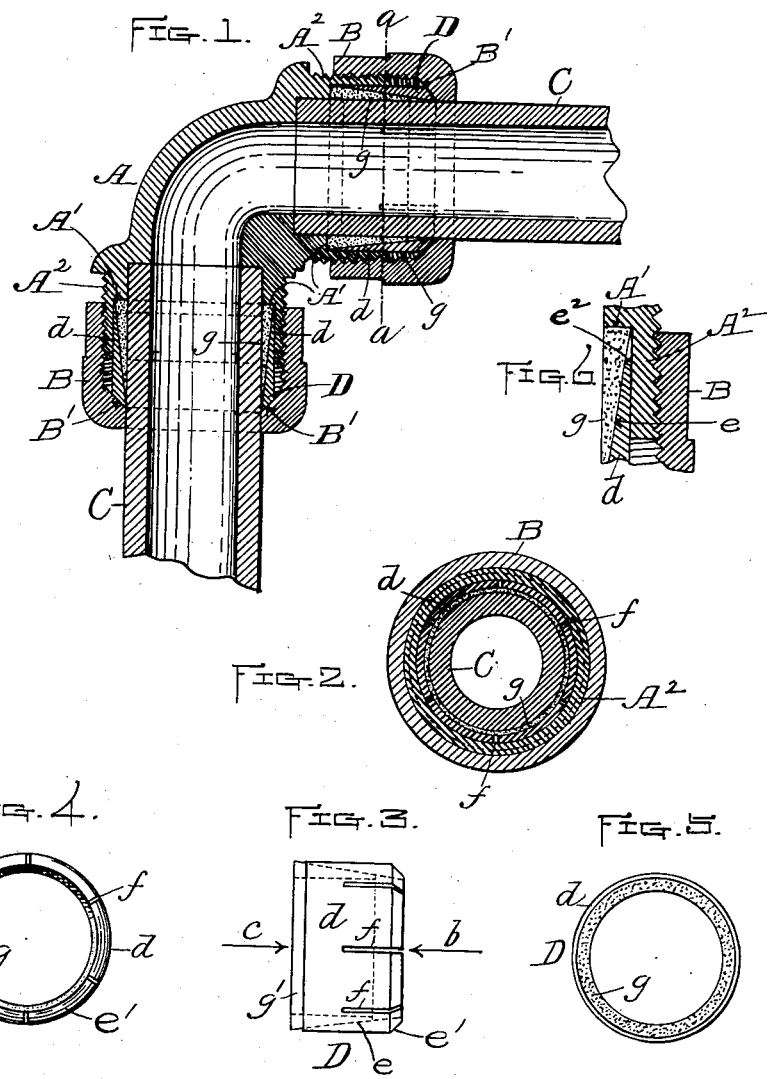

No. 762,545.

Patented June 14, 1904.

UNITED STATES PATENT OFFICE.

HENRY T. MERRIAM, OF MILLBURY, MASSACHUSETTS.

PIPE-COUPLING.

SPECIFICATION forming part of Letters Patent No. 762,545, dated June 14, 1904.

Application filed August 12, 1903. Serial No. 169,183. (No model.)

*To all whom it may concern:*

Be it known that I, HENRY T. MERRIAM, of Millbury, in the county of Worcester and State of Massachusetts, have invented certain new and useful Improvements in Pipe-Couplings; and I do hereby declare that the following is a full, clear, and exact description thereof, reference being had to the accompanying drawings, forming a part of this specification, and in which—

Figure 1 represents a central longitudinal section through a pipe-coupling embodying my improvements. Fig. 2 is a transverse section thereof, taken on line $aa$, Fig. 1. Fig. 3 is a detached side view of my improved combined gland and packing-ring used in said coupling. Fig. 4 is an end view of said combined gland and packing-ring looking in the direction of arrow $b$, Fig. 3. Fig. 5 is an opposite end view thereof looking in the direction of arrow $c$; and Fig. 6 is an enlarged section of part of Fig. 1, which will be hereinafter described.

The object of my invention is to provide a coupling for metal pipes which may be manipulated conveniently and quickly and whereby a perfectly tight joint may be obtained at the least possible expense in the construction of the coupling.

Said invention consists in the combination of a metal gland and packing-ring, with the threaded ends and screw-caps of a coupling and the ends of the pipes to be coupled, said gland being preferably slotted transversely at different points around its circumference part way in from its outer end and adapted to receive said packing-ring, which fits therein, the same projecting a little outside of the inner end of the gland and extending part way through the gland, as and for the purpose hereinafter more fully set forth.

To enable others to better understand the nature and purpose of my said invention, I will now proceed to describe it more in detail, with reference to the accompanying drawings.

In said drawings, A represents the body, and B B the screw-caps, of the coupling.

C C are the pipe ends to be coupled, and D my improved combined gland and packing-ring.

The two ends of the couplings are constructed alike, and therefore only one end will be described in detail.

Each end $A'$ of body A of the coupling is externally threaded and provided with the threaded cap B, similar to other couplings of this class. The combined gland and packing-ring is arranged longitudinally between the shoulder $A'$ on body A and internal annular bevel $B'$ on cap B and laterally between said cap and body upon the outer side and pipe C upon the inner side. Said gland is cylindrical in shape upon the outside, beveled, as shown at $e$, upon the inside and its outer end also beveled, as shown at $e'$, said bevel $e'$ fitting against the bevel $B'$ on cap B when the parts are assembled as is shown in the drawings.

The packing-ring is made cylindrical in shape upon the inside to fit pipe C and beveled upon the outside to fit the bevel of the inside of gland $d$. It extends from a short distance beyond the inner end of the gland to within a short distance of the outer end of said gland.

The gland and packing being thus constructed and arranged as above described, it will be apparent that when pressure is applied to bear upon the outer beveled end $e'$ of said gland by screwing in the cap B said gland being forced inward longitudinally exerts a strong lateral inward pressure against the soft-metal packing $g$, and consequently produces a very tight joint between said parts and the pipe end C, the harder the pressure the tighter the joint being made. Said inward longitudinal pressure against the outer end of the gland also compresses the inner enlarged end $g'$ of the packing-ring and expands it laterally, thus forming an auxiliary to the aforesaid lateral pressure in effecting a tight joint. To facilitate said latter compression of the inner end of the packing-ring, the inner end of the gland may be beveled inward, as is shown at $e^2$ in Fig. 6.

It is preferable to make the gland $d$ with transverse slots $f$ at about equidistant points around its circumference and extending part way in from its outer end, as is best shown in Figs. 3 and 4, the purpose thereof being to permit said gland to be contracted when the end pressure is imparted to the end bevel $e'$, as previously described. Said slots are designed to be used only on the larger grades of pipes and couplings. For the smaller grades they are not necessary in effecting the desired result. I therefore reserve the right to slot said glands or not, as desired and required by circumstances in practice.

By the foregoing construction it is obvious that I am enabled to obtain a double pressure against the pipe end, which produces a very perfect connection, as well as a very simple and inexpensive one, not not liable to leak or get out of repair.

I of course do not limit myself to any particular form of coupling, the essential feature being, as before stated, the use of the combined gland and packing with the old parts of the coupling rather than the particular construction adopted.

Having described my invention, what I claim as new, and desire to secure by Letters Patent, is—

In a pipe-coupling, the combination with a coupling member having a socket in its end, of a pipe entering said coupling member and forming the interior wall of said socket, an externally-beveled packing-ring engaging the socket and the exterior of the inner end of the socket and the exterior of the pipe, an internally-beveled gland engaging the exterior beveled surface of said packing-ring and fitting said socket, and a thimble secured upon the end of the coupling member and engaging said gland, substantially as set forth.

HENRY T. MERRIAM.

Witnesses:
A. A. BARKER,
E. N. BARKER.